United States Patent [19]

De Noyer

[11] 3,904,136
[45] Sept. 9, 1975

[54] GRANULATOR WITH IMPROVED ACCESSIBILITY

[75] Inventor: Donald B. De Noyer, Beloit, Wis.

[73] Assignee: Beloit Corporation, Beloit, Wis.

[22] Filed: May 1, 1974

[21] Appl. No.: 466,046

[52] U.S. Cl. ............................ 241/186 A; 241/287
[51] Int. Cl.² ........................................ B02C 17/02
[58] Field of Search ........ 241/186 R, 186 A, 285 B, 241/287

[56] References Cited
UNITED STATES PATENTS

| 149,214 | 3/1874 | Galt et al. | 241/186 X |
| 1,159,433 | 11/1915 | Thiry | 241/285 B |
| 1,960,626 | 5/1934 | Everett | 241/186 R |
| 2,391,480 | 12/1945 | Ross et al. | 241/186 A |
| 3,301,291 | 1/1967 | Hughes | 241/186 R |
| 3,419,223 | 12/1968 | Morin | 241/285 B |
| 3,625,138 | 12/1971 | Shinn et al. | 241/186 A |
| 3,795,369 | 5/1974 | Moser | 241/186 A |

Primary Examiner—Granville Y. Custer, Jr.
Attorney, Agent, or Firm—Dirk J. Veneman; Bruce L. Samlan; Gerald A. Mathews

[57] ABSTRACT

A granulator for regrinding plastic material has fixed thereto a conveyor such as an auger-feed conveyor for delivering material into a hopper and hence into the granulator. The combined hopper-conveyor unit is pivotally connected to the housing of the bladed granulating mechanism so as to pivot approximately 90° relative thereto about a horizontal axis parallel to a vertical plane passing through the longitudinal centerline of the conveyor, thereby exposing the blades of the granulator for cleaning, replacement or the like. A mechanical device including a vertically oriented threaded shaft simplifies the task of moving the hopper-conveyor unit about said pivot axis.

18 Claims, 7 Drawing Figures

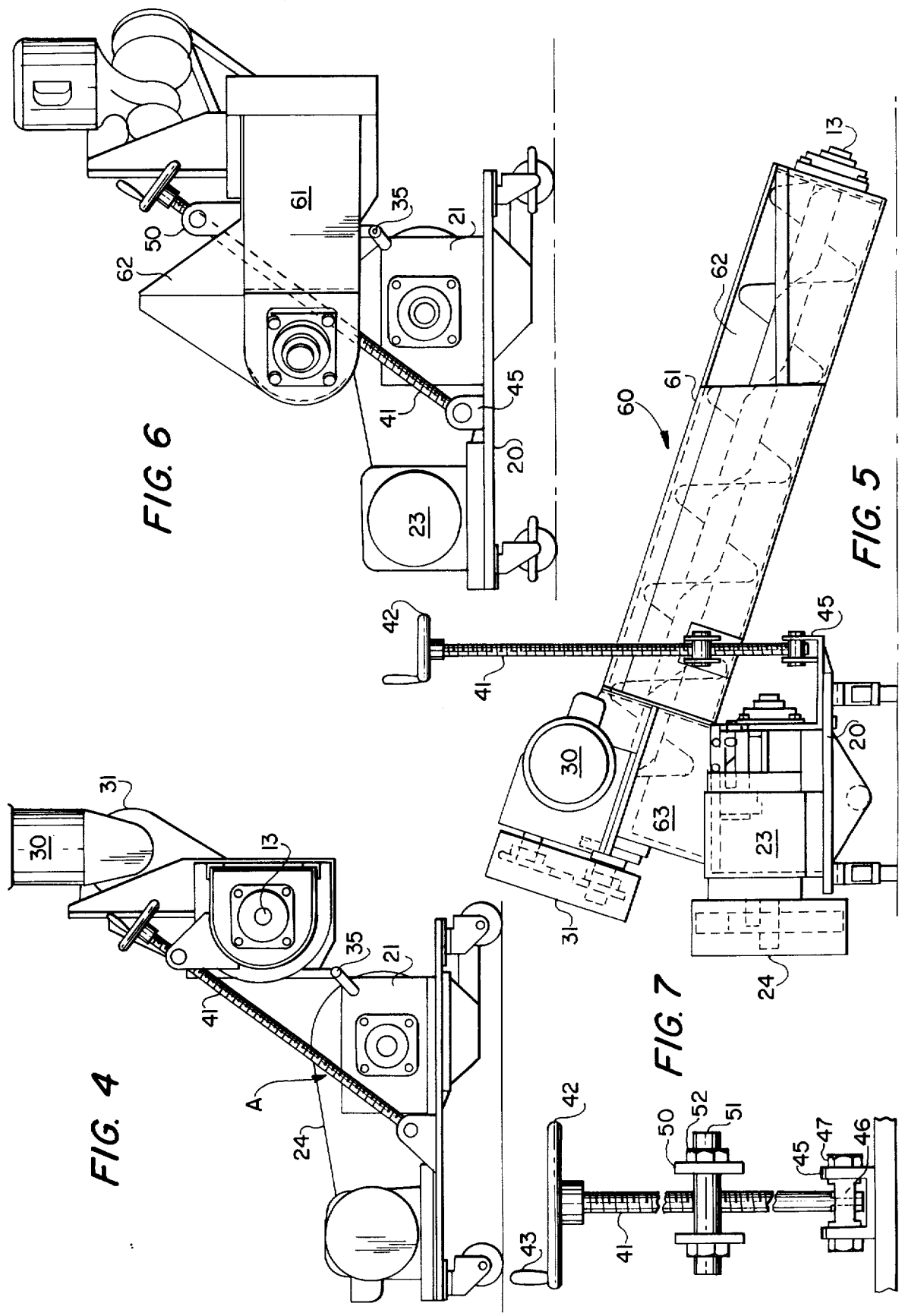

GRANULATOR WITH IMPROVED ACCESSIBILITY

BACKGROUND OF THE INVENTION

This invention relates to granulators for plastic material or the like, and in particular it relates to a granulator of this type which has associated therewith a conveyor for delivering material into the granulator.

It is known to provide granulators for plastic material or the like which include a bladed granulating mechanism, a hopper positioned over the granulating mechanism for receiving the material and delivering it to the granulating mechanism and a conveyor for delivering material into the hopper. One known arrangement includes an augar-feed conveyor formed integrally with the hopper so as to deliver material thereinto.

It must be recognized that in any granulating mechanism for plastic materials or the like, it is essential to provide some means for obtaining access to the interior of the granulating mechanism, both to clean the interior of the granulating mechanism and to change the blades thereof. Notwithstanding this need for access, the means known heretofore for providing such access have been less than satisfactory. According to one arrangement, the combined hopper-conveyor unit is constructed so as to be removable off of the remainder of the granulating mechanism. However, when it is realized that the conveyor, for example an auger-feed conveyor, along with the hopper and the motor for operating the conveyor may weigh approximately 600 pounds in an average size unit, it will be seen that this is quite a cumbersome task. Most likely it will involve the use of additional heavy equipment such as a crane or the like.

In such conveyor-fed granulators, the conveyor, for example the auger of an auger-fed granulator, extends from the hopper in either a horizontal or a downwardly inclined direction. For the horizontally extending "cantilvered" augers a partial solution has been provided in that the conveyor-hopper unit has been mounted on the granulating device housing via a pivotable connection with a pivot axis running horizontally and essentially perpendicular to a vertical plane passing through the longitudinal centerline of the conveyor. This location of the pivot axis is quite logical since it somewhat eliminates the problem of handling such a heavy unit since the mass of the combined conveyor-hopper unit is somewhat counterbalance i.e. at least a large portion of the weight is located on each side of a vertical plane passing through the pivot axis. However, this arrangement has the disadvantage that only a very slight opening can be achieved since after approximately 45° the remote end of the conveyor would hit the floor thereby preventing any further movement of the conveyor-hopper unit about said axis. Consequently, at best only a very slight "clam shell" type opening is achieved, and even this can be accomplished only on the horizontally oriented conveyor and not on the inclined conveyor.

Thus, there exists a need for further improvements which will more satisfactorily solve the problem of providing access to the interior of a granulating mechanism of the type described.

SUMMARY OF THE INVENTION

Thus, it is a purpose of the present invention to provide a conveyor-fed granulator of the type described having means for improving the accessibility to the cutting mechanism thereof.

This purpose of the present invention is achieved by providing a conveyor-fed granulator so constructed and arranged that the entire conveyor-hopper unit can be swung about a pivot axis which is generally horizontal and which is essentially parallel to a vertical plane including the longitudinal centerline of the conveyor. This horizontal axis is located along one side of the apparatus so that the combined conveyor-hopper arrangement is free to turn through a considerable angle — in the preferred embodiment 90° — so as to completely expose the interior of the granulating mechanism.

Such movement, which would appear illogical since it locates the entire weight of the hopper-conveyor on one side of the unit, is feasible in the present invention because there is provided in combination therewith a simple mechanical means having a sufficiently high mechanical advantage that even simple manual operation thereof can very easily turn the conveyor-hopper unit about said axis through an angle of at least 90°.

This mechanical means may comprise a vertically oriented threaded shaft journaled at its lower end in means fixed with respect to the housing of the granulating device and threadedly engaging intermediate its ends a nut which is in turn operatively connected to the conveyor-hopper unit. Consequently, by simply turning a hand wheel located at the top of the threaded shaft it is possible to turn the conveyor-hopper unit about said pivot axis.

The invention is applicable to any type of elongated conveyor connected to a hopper although in practice it has been found particularly suitable for the combination of an auger-feed conveyor, and it has been applied to both the horizontally extending cantilevered conveyor and the inclined conveyor.

Thus, it is an object of this invention to improve the accessibility to the interior of the granulating mechanism of the conveyor-fed granulator.

It is another object of this invention to provide, in a conveyor-fed granulator of the type described, an arrangement wherein the conveyor-hopper unit is pivoted about an essentially horizontal axis generally parallel to a vertical plane through the longitudinal centerline of the conveyor, whereby the said unit can be turned at least 90° to provide complete access to the interior of the granulating mechanism.

It is another object of this invention to provide, in a conveyor-fed granulator of the type described, a new and improved means for quickly and easily providing substantially complete access to the interior of the granulating mechanism.

It is still another object of this invention to provide, in a conveyor-fed granulator of the type described, a simple mechanical means having a high mechanical advantage for turning the conveyor-hopper unit about a horizontal axis parallel to a vertical plane through the centerline of the conveyor for very easily providing substantially complete access to the interior of the granulating mechanism.

It is still another object of this invention to provide, in a granulator mechanism of the type described, an arrangement wherein the conveyor-hopper unit is pivotable about a horizontal axis parallel to a vertical plane passing through the conveyor centerline and including a threaded shaft arranged essentially vertically on the side of the conveyor opposite from the said pivot axis, wherein by simply turning the threaded shaft, one can easily pivot the conveyor-hopper unit about said axis.

Other objects and advantages of the present invention will become apparent from the detailed description to follow, together with the accompanying drawings.

BRIEF DESCRIPTION OF THE DRAWINGS

Preferred embodiments of the invention will now be described in detail below with reference to the accompanying drawings which are provided for purposes of illustration, and wherein:

FIG. 4 is an end elevation view similar to FIG. 3 but with the conveyor-hopper unit moved to the open position.

FIG. 5 is a side elevation view similar to FIG. 1 but showing a different form of auger-feed granulator employing the features of the present invention.

FIG. 6 is an end elevation view, viewed from the right-hand end of FIG. 5, but with the conveyor-hopper unit moved to the open position.

FIG. 7 is an enlarged view of a portion of a mechanical mechanism which is present in the embodiment of FIGS. 1 through 4 as well as the embodiment of FIGS. 5 and 6.

DETAILED DESCRIPTION OF THE PREFERRED EMBODIMENTS

Figure 1:
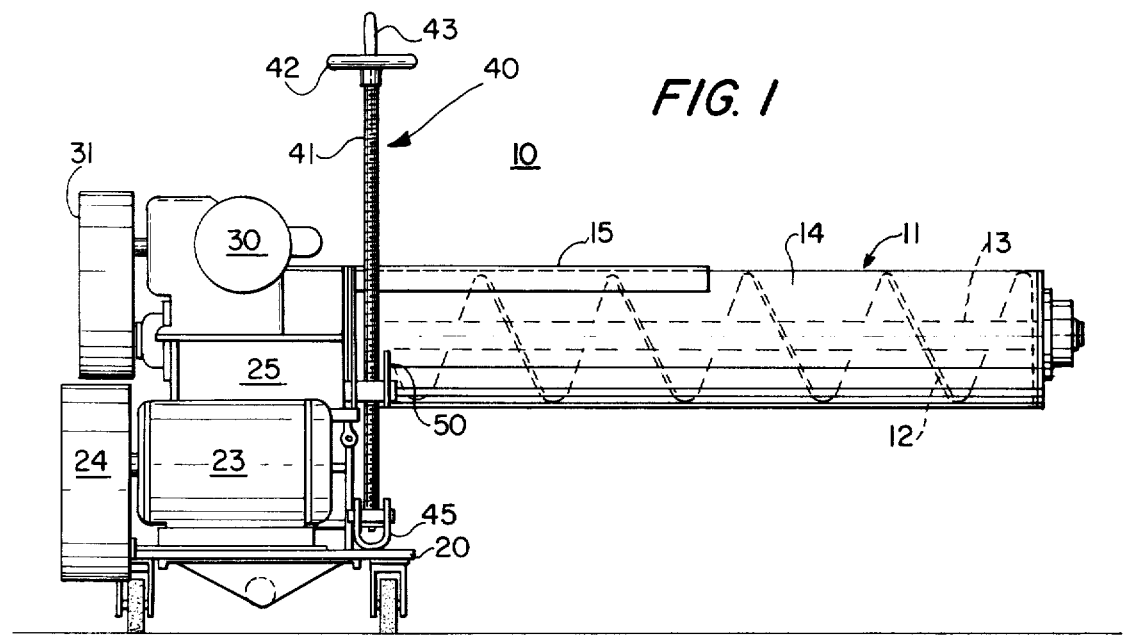
FIG. 1 is a side elevational view of an auger-feed granulator including the features of the present invention.

Referring now to the drawings, like elements are represented by like numerals throughout the several views.

Figure 2:
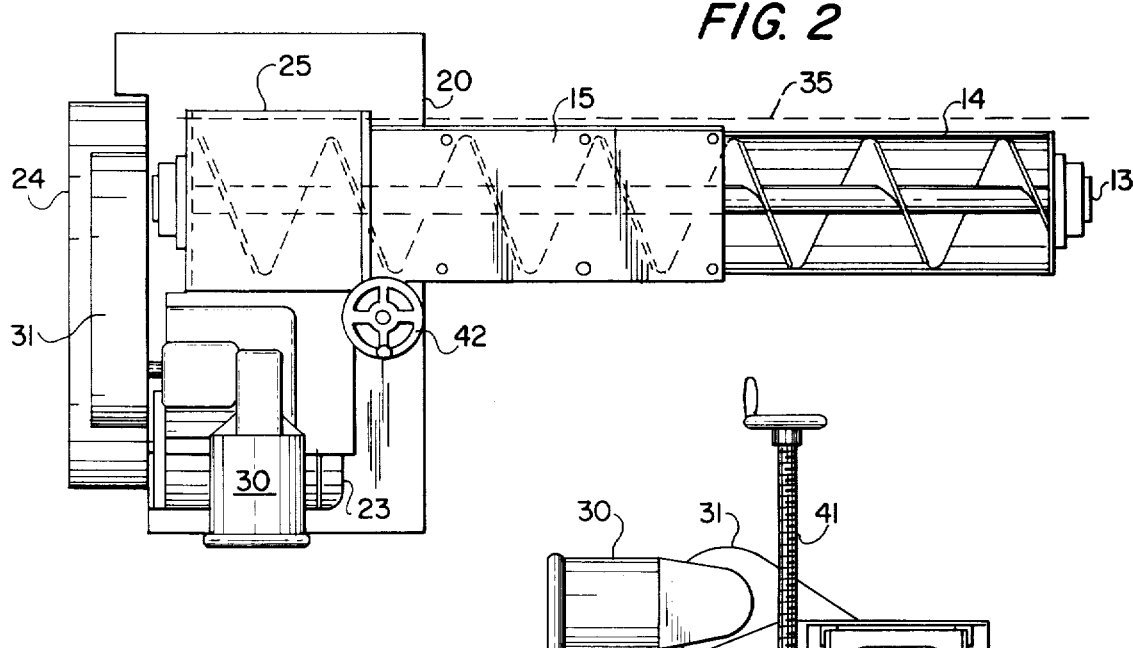
FIG. 2 is a plan view of FIG. 1.
Figure 3:
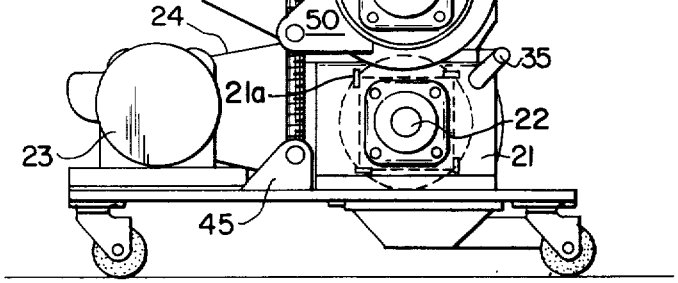
FIG. 3 is an end elevation view, viewed from the right-hand end of FIG. 1.

Referring to FIGS. 1 through 3 there is shown an auger-feed granulator 10 including a cantilevered horizontally extending auger conveyor 11 including therein a conventional screw type auger blade 12 mounted on a shaft 13. The end of this shaft (the left end in FIGS. 1 and 2) is engaged by a suitable driving belt, pulley or the like within a cover 31 which transmits motive power to the shaft 13 from a suitable motor such as motor 30. At the downstream end, the conveyor delivers material into a hopper 25. The upper portion of the conveyor forms an opening 14 for the introduction of material and a cover plate 15 covering the downstream portion of the conveyor. Turning momentarily to FIG. 4, it will readily be apparent that the auger-feed conveyor, the hopper 25, the drive belt within the cover plate 31 and the drive motor 30 are interconnected with each other to move in unison about a horizontal axis 35 located essentially on the side of the apparatus. All of these parts which move together about the axis 35 are conveniently referred to as the conveyor-hopper unit.

The apparatus further includes a base 20 having a granulating mechanism 21 which is of the conventional type having a plurality of blades 21a mounted on and rotatable with a shaft 22. The shaft 22 receives its power from a motor 23 also mounted on the base 20 via a driving belt 24. Referring again momentarily to FIG. 4, it will be readily apparent that when the conveyor-hopper unit has been turned approximately 90° full access is provided to the interior of the granulating mechanism 21 as indicated by the arrow A in FIG. 4.

As indicated earlier, this conveyor-hopper unit is normally quite heavy, for example 500 to 600 pounds in an average size granulator apparatus. Locating the pivot axis 35 to the side of the entire unit eliminates the possibility of utilizing the portions of the conveyor-hopper unit for counter-balancing about a pivot axis. However, this arrangement of the pivot axis, in combination with the quick opening mechanism to be described immediately below, has been found to be remarkably successful in that it makes it possible to accomplish with simple manual movements an access as complete as that accomplished heretofore only by the extremely cumbersome task of completely removing the conveyor-hopper unit.

This quick opening mechanism 40 includes a threaded shaft 41 which is oriented essentially vertically in the closed position of the apparatus and includes a convenient hand wheel 42 at the top thereof with a handle grip 43 thereon.

Referring now to FIG. 7 as well as FIGS. 1 through 4, the shaft 41 is rotatably journaled at its lower end in a support 46 which is itself rotatably journaled in a bracket 45 and held therein by suitable bolts 47. The bracket 45 is rigidly secured to the base 20 such as by welding or the like. This shaft 41 is also operatively connected to the conveyor-hopper unit in the following manner. A bracket 50 which is rigid with this unit extends outwardly therefrom and rotatably journals therein a pin 51, which pin 51 is held in place horizontally by means of suitable clips 52. This pin 51 includes a threaded opening in the central portion thereof which threadedly receives shaft 41. Hence, turning movement of the shaft 41 via the threaded engagement with pin 51 will cause raising and lowering of the conveyor-hopper unit.

The operation of the invention is essentially self-evident from viewing and comparing FIGS. 3 and 4. To move from the closed FIG. 3 position to the open FIG. 4 position, one would simply turn the shaft 41 in the manner described above. The mechanical advantage of this arrangement is such that this shaft 41 can be turned very easily by any person even with minimal strength. This is possible because of the substantial mechanical advantage inherent in the screw mechanism itself and also because of the particular arrangement wherein the lever arm from the pivot axis to the point of application of the torque (at pin 51) is quite long. An advantage of the invention is that with the particular arrangement as described herein the long lever arm does not require any additional space since this lever arm extends across essentially the existing apparatus. It will also be noted that there is little or no possibility of the apparatus moving inadvertantly from the open position back to the closed position under the weight of the conveyor-hopper unit. The reason for this is evident in FIG. 4 wherein it can be seen that the weight of the conveyor-hopper unit is now beyond a vertical plane through the pivot axis so that its force would be directed towards pulling the shaft 41 clockwise. However, even in intermediate positions wherein the bracket 50 is much closer to the closed position, such inadvertant downward movement without turning of the shaft 41 would not occur simply because of the inherent inefficiency of the screw itself. The mechanism is therefore essentially self-locking in any position.

FIGS. 5 and 6 illustrate the present invention as applied to the type of auger-feed granulator having an inclined auger. Almost all of the elements in this embodiment are essentially the same as the corresponding elements in FIGS. 1 through 4, the few exceptions being the inclined auger conveyor 60 and the inclined hopper 63. In this particular environment the entire top of the auger 60 is covered by a plate 61 and a feed entrance 62 is provided on one side thereof.

It will be readily apparent that because the lower end of the auger conveyor 60 is almost at the floor, it would not have been possible to apply to this type of auger conveyor the arrangement mentioned earlier (with respect to the prior art horizontal auger conveyors) wherein the conveyor-hopper unit was opened by slight pivotal movement about a horizontal axis perpendicular to a vertical plane through the longitudinal centerline of the conveyor. However, it will be evident that with the present invention the conveyor-hopper unit can be swung up and to the side to expose the interior of the granulating mechanism with just the same ease as in the embodiment of FIGS. 1 through 4.

Although the invention has been described in considerable detail with respect to preferred embodiments thereof, it will be apparent that the invention is capable of numerous modifications and variations apparent to those skilled in the art without departing from the spirit and scope of the invention as defined in the claims.

I claim:

1. A granulator apparatus for feeding and granulating plastic material comprising:
    a bladed granulating mechanism,
    an elongated conveyor means for conveying material to the top of the bladed granulator mechanism, said conveyor means connected to the granulator mechanism by a pivot connection having a generally horizontal axis extending generally parallel to a plane passing through the longitudinal centerline of the elongated conveyor means,
    and a mechanical means for interconnecting the conveyor means and the granulating mechanism for pivoting the conveyor means about the axis in a vertical plane normal to said horizontal axis to expose the interior of the granulating mechanism.

2. An apparatus according to claim 1, said mechanical means including an elongated vertically extending threaded shaft operatively journaled at its lower end to the granulating mechanism and threadedly engaged intermediate its length with a nut operatively connected to the conveyor means, whereby turning of the shaft turns the conveyor means about said axis.

3. An apparatus according to claim 2, said pivot axis located on one side of the conveyor means, and said threaded shaft located on the other side thereof.

4. An apparatus according to claim 3, said mechanical means operable to turn the conveyor means at least approximately 90° about said pivot axis.

5. An apparatus according to claim 3, including a motor attached to the conveyor means for operating the same, said motor being turnable about the axis with the said conveyor means.

6. An apparatus according to claim 3, said conveyor means being an auger conveyor, the axis of which is inclined upwardly in the direction of feed through the conveyor means.

7. An apparatus according to claim 3, said conveyor means being an auger conveyor, the axis of which is horizontal.

8. Apparatus according to claim 1, including a housing surrounding the granulator mechanism, a hopper above the granulator mechanism having an open bottom through which the material is delivered into the granulating mechanism, said conveyor means positioned to feed material into the upper portion of the hopper, said hopper being movable about said pivot axis with the conveyor means to expose the interior of the granulating mechanism.

9. Apparatus according to claim 8, said conveyor means being an auger conveyor, the hopper being rigid with the downstream end thereof, and said mechanical mechanism including an elongated vertically extending threaded shaft operatively journaled at its lower end to the granulating mechanism and threadedly engaged intermediate its length with a nut operatively connected to the auger conveyor, whereby turning of the shaft turns the auger conveyor about said axis.

10. An apparatus according to claim 9, said pivot axis located on one side of the auger conveyor and said threaded shaft located on the other side thereof.

11. Apparatus according to claim 9, including a motor for driving the auger conveyor, said motor being fixedly connected to the hopper and the auger-feed conveyor for movement therewith about said pivot axis.

12. An apparatus according to claim 9, said auger conveyor having a horizontal axis.

13. An apparatus according to claim 9, said auger conveyor having an axis which is upwardly inclined toward the hopper.

14. Apparatus according to claim 1, said pivot axis located on one side of the conveyor means and said mechanical means located on the other side thereof.

15. An auger-feed granulator comprising:
    a bladed granulating device,
    a housing surrounding the granulating device,
    a hopper located above the granulating device and having an open bottom for delivering material into the granulating device,
    an elongated auger conveyor fixed to the hopper and positioned to deliver material into the hopper,
    and a pivoted connection connecting one edge of the hopper to the granulating device housing, the pivot axis of the connection being essentially horizontal and essentially parallel to a vertical plane passing through the longitudinal axis of the granulating device.

16. An apparatus according to claim 15, including a vertically extending threaded shaft on the side of the hopper and auger-feed conveyor opposite from the said pivot connection, said shaft being journaled at its lower end with means fixed with respect to the granulating device, and said shaft being threadedly engaged intermediate its ends with a nut which is operatively connected to the auger-feed conveyor, whereby turning of the threaded shaft about its axis lifts the auger-feed conveyor and the hopper upwardly about said pivot axis.

17. An apparatus according to claim 16, said auger-feed conveyor having a horizontal axis.

18. Apparatus according to claim 16, said auger-feed conveyor having an axis which is upwardly inclined toward the hopper.

* * * * *